(12) United States Patent
Chiba et al.

(10) Patent No.: US 9,835,194 B2
(45) Date of Patent: Dec. 5, 2017

(54) STEEL WIRE FOR BOLT, BOLT, AND MANUFACTURING PROCESSES THEREFOR

(71) Applicants: Kobe Steel, Ltd., Kobe-shi (JP); SUGITA WIRE, LTD., Sumida-ku (JP)

(72) Inventors: Masamichi Chiba, Kobe (JP); Yousuke Matsumoto, Kobe (JP); Ichiro Sugita, Sumida-ku (JP); Masaru Tanimoto, Sumida-ku (JP)

(73) Assignees: Kobe Steel, Ltd., Kobe-shi (JP); SUGITA WIRE, LTD., Sumida-ku (JP)

( * ) Notice: Subject to any disclaimer, the term of this patent is extended or adjusted under 35 U.S.C. 154(b) by 286 days.

(21) Appl. No.: 14/349,800

(22) PCT Filed: Oct. 1, 2012

(86) PCT No.: PCT/JP2012/075401
§ 371 (c)(1),
(2) Date: Apr. 4, 2014

(87) PCT Pub. No.: WO2013/051513
PCT Pub. Date: Apr. 11, 2013

(65) Prior Publication Data
US 2014/0241829 A1 Aug. 28, 2014

(30) Foreign Application Priority Data
Oct. 7, 2011 (JP) .................. 2011-223114

(51) Int. Cl.
| | | |
|---|---|---|
| *C21D 8/06* | (2006.01) | |
| *C21D 9/52* | (2006.01) | |
| *C22C 38/32* | (2006.01) | |
| *C22C 38/54* | (2006.01) | |
| *C22C 38/24* | (2006.01) | |
| *C22C 38/26* | (2006.01) | |
| *C22C 38/28* | (2006.01) | |
| *F16B 33/06* | (2006.01) | |
| *C22C 38/38* | (2006.01) | |
| *C22C 38/58* | (2006.01) | |
| *C21D 9/00* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/46* | (2006.01) | |
| *C22C 38/48* | (2006.01) | |
| *C22C 38/50* | (2006.01) | |
| *B21F 45/16* | (2006.01) | |
| *C22C 38/20* | (2006.01) | |

(52) U.S. Cl.
CPC .............. *F16B 33/06* (2013.01); *B21F 45/16* (2013.01); *C21D 8/065* (2013.01); *C21D 9/0093* (2013.01); *C22C 38/001* (2013.01); *C22C 38/02* (2013.01); *C22C 38/04* (2013.01); *C22C 38/06* (2013.01); *C22C 38/20* (2013.01); *C22C 38/24* (2013.01); *C22C 38/26* (2013.01); *C22C 38/28* (2013.01); *C22C 38/32* (2013.01); *C22C 38/38* (2013.01); *C22C 38/42* (2013.01); *C22C 38/46* (2013.01); *C22C 38/48* (2013.01); *C22C 38/50* (2013.01); *C22C 38/54* (2013.01); *C22C 38/58* (2013.01); *C21D 9/52* (2013.01); *C21D 2211/005* (2013.01); *C21D 2211/009* (2013.01)

(58) Field of Classification Search
None
See application file for complete search history.

(56) References Cited

FOREIGN PATENT DOCUMENTS

| | | |
|---|---|---|
| CA | 2 845 611 A1 | 3/2013 |
| JP | 64 7136 | 2/1989 |
| JP | 2 166229 | 6/1990 |
| JP | 6 185513 | 7/1994 |
| JP | 11 315348 | 11/1999 |
| JP | 2000 337334 | 12/2000 |
| JP | 2001-288513 A | 10/2001 |
| JP | 2003 113444 | 4/2003 |
| JP | 2003 193183 | 7/2003 |
| JP | 2005-133155 A * | 5/2005 |
| JP | 2005-133155 A | 5/2005 |

(Continued)

OTHER PUBLICATIONS

Machine-English translation of JP2005-133155 A, Murakami Toshio et al., May 26, 2005.*
Machine-English translation of JP 2003-113444, Chiba Masamichi et al., Apr. 18, 2003.*
Machine-English translation of JP2006-291237, Momozaki Hiroshi, Oct. 26, 2006.*
Extended European Search Report issued Mar. 1, 2016 in Patent Application 12837933.6.

(Continued)

*Primary Examiner* — Deborah Yee
(74) *Attorney, Agent, or Firm* — Oblon, McClelland, Maier & Neustadt, L.L.P.

(57) ABSTRACT

A steel wire for high-strength bolts is used for a non heat-treatment bolt with an excellent cold forgeability for which quenching and tempering steps have been omitted after bolt formation, and which has a tensile strength of 1200 MPa or more and an excellent delayed fracture resistance. The steel wire includes C, Si, Mn, P, S, Cr, Al, N, and B, at least one selected from the group consisting of Ti, V, and Nb with the balance consisting of iron and inevitable impurities. The steel wire has a microstructure wherein ferrite and perlite have a total area rate of 98% or more, perlite lamellar spacing is 250 nm or less, and an area rate of the perlite is more than 40%, and 80% or less. The steel wire has a tensile strength of 1300 MPa or less.

20 Claims, No Drawings

(56) References Cited

FOREIGN PATENT DOCUMENTS

JP          4031068      1/2008
JP       2009 242916    10/2009

OTHER PUBLICATIONS

English translation of the International Preliminary Report of Patentability and Written Opinion issued Apr. 17, 2014 in PCT/JP2012/075401.
International Search Report Issued Dec. 18, 2012 in PCT/JP12/075401 Filed Oct. 1, 2012.

* cited by examiner

STEEL WIRE FOR BOLT, BOLT, AND MANUFACTURING PROCESSES THEREFOR

CROSS REFERENCE TO RELATED APPLICATIONS

The present application is a 35 U.S.C. §371 national stage patent application of International patent application PCT/JP2012/075401, filed on Oct. 1, 2012, published as WO/2013/051513 on Apr. 11, 2013, the text of which is incorporated by reference, and claims the benefit of the filing date of Japanese application no. 2011-223114, filed on Oct. 7, 2011, the text of which is also incorporated by reference.

TECHNICAL FIELD

The present invention relates to a steel for bolt used for automobiles, various industrial machines and others, particularly to a high-strength bolt, a high-strength steel wire for bolt used for this bolt, and respective manufacturing processes therefor, where the high-strength bolt has a high tensile strength of 1200 MPa or more without quenching nor tempering treatment after formation into a bolt shape and has both of excellent cold forgeability and delayed fracture resistance.

BACKGROUND ART

In high-strength fastening parts used for automobiles, ordinary machines, and buildings, a high-strength alloy steel with increased content of Cr, Mo and so on is used and subjected to quenching and tempering treatments, thereby ensuring a target strength. In high-strength fastening parts used for buildings or various light electrical appliances, a low carbon steel with carbon content of about 0.20% is usually used and subjected to carburizing, quenching, and tempering treatments, thereby ensuring a target strength.

However, in the former case, effect of hydrogen penetration into the steel in use environment may cause fracture (delayed fracture) of the bolt after tightened, and therefore the actual tensile strength of the bolts is restrained to 1100 MPa or less. In the latter case, carburizing and quenching cause a topmost surface hardness of more than Hv 600 (1960 MPa in terms of tensile strength), increasing sensitivity of the bolt to a slight environmental change, such as dew condensation due to temperature difference, so that the bolt involves a risk of delayed fracture.

Since it is assumed that the delayed fracture is caused by complicatedly interwound factors, it is difficult to specify a cause therefor. However, it is generally common understanding that hydrogen embrittlement is related to the delayed fracture. As factors affecting the hydrogen embrittlement, the following have been provisionally recognized: tempering temperature, structure, material hardness, crystal grain size, various alloy elements, and others. However, a process for preventing the hydrogen embrittlement has not been established and therefore the fact is that various processes based on trial and error have been suggested.

In recent years, attention has been paid to non heat-treatment bolts to which quenching and tempering steps after bolt forming have been omitted, in view of decreasing costs for the bolt manufacture as well as decreasing greenhouse gas emission during the process for the bolt manufacturing. The non heat-treatment bolts are required to ensure a target strength by work hardening during the wire drawing. However, cold-forging of the work-hardened steel wire causes restriction on the bolt shape and shortening the forging die life. Since this effect becomes more remarkable as the bolt strength is made higher, a solution of the deleterious effect has been strongly desired. Against these problems, the following processes are disclosed as conventional arts.

Patent Document 1 discloses a technique of making use of the dispersion of fine compounds to restrain delayed fracture. In this technique, an alloy steel is subjected to quenching and then subjected to tempering at high temperature so as to precipitate a large amount of fine alloy compounds and further causing the resultant precipitation to trap hydrogen moving around in the steel (diffusible hydrogen), thereby improving the steel in delayed fracture resistance. However, this solution essentially requires addition of a large amount of alloying elements and steps for the quenching and tempering, causing problems that costs for manufacturing bolts are increased and that greenhouse gas is released into the atmosphere when the bolts are manufactured.

Patent Document 2 discloses a process of subjecting perlite steel to high strength wire drawing to manufacture a non heat-treatment bolt improved in delayed fracture resistance. In this technique, formation of perlite structure vanishes prior austenite grain boundaries largely lowered in grain boundary strength by hydrogen embrittlement and further cause an interface between cementite and ferrite in the perlite structure to trap hydrogen in the steel, thereby improving the steel in delayed fracture resistance. However, in the technique disclosed in Patent Document 2 targeting a bolt strength of 1500 MPa, the high proportion of the perlite structure resulting from prioritizing the high strength causes the high proportion of the perlite structure so that the forging die life is greatly shortened due to increased deformation resistance during bolt manufacturing.

Patent Document 3 discloses a technique for improving delayed fracture resistance of a non heat-treatment steel for upset bolt with a tensile strength of 900 MPa or more by dispersing a precipitation in ferrite and perlite structures. However, in case that the tensile strength of a bolt is 1100 MPa or more, the critical upset ratio to crack initiation is lowered as the steel is subjected to high strength wire drawing. This causes generation of crack and lowering in delayed fracture resistance during bolt manufacturing.

Patent Document 4 discloses a technique for improving cold forgeability of non heat-treatment steel for bolt with a tensile strength of 900 MPa or more by using bainite structure. However, since the bainite structure is low in work hardening rate, a bolt strength of 1200 MPa or more can not be easily achieved. Further, the bainite structure is more easily affected by stress relaxation due to relaxation-operation than martensite and perlite structures. As a result, a problem is caused also from the viewpoint of the maintenance of properties of the bolts after tightening the bolts.

Patent Document 5 discloses a technique for yielding a non heat-treatment steel wire for bolt with excellent cold forgeability by subjecting a medium carbon manganese steel rod to isothermal transformation process. This technique particularly focuses on decreasing strength unevenness of a steel material when hot rolling as well as decreasing deformation resistance during bolt manufacturing, thereby achieving manufacture of bolts with a tensile strength in the order of 1000 MPa. However, since not introducing a process for making the effect of hydrogen in the steel harmless, Patent Document 5 does not cover bolts with a tensile strength of 1200 MPa or more.

PRIOR ART DOCUMENT

Patent Document

Patent Document 1: Japanese Patent No. 4031068
Patent Document 2: JP 2000-337334 A
Patent Document 3: JP 2003-113444 A
Patent Document 4: JP 02-166229
Patent Document 5: Japanese Patent No. 1521033

SUMMARY OT INVENTION

Problems To Be Solved by the Invention

The present invention has been made in light of circumstances as described above and an object thereof is to provide a non heat-treatment high-strength bolt that is manufactured without being subject to quenching or tempering treatment after bolt formation and that has a tensile strength of 1200 MPa or more and an excellent delayed fracture resistance, a high-strength steel wire for bolt that is used for the high-strength bolt, and respective manufacturing processes therefor.

Means for Solving the Problems

The present invention is a steel wire for bolt comprising, C: 0.30 to 0.50% (percent by mass hereinafter expressed as well for chemical compositions), Si: 0.02 to 0.1%, Mn: 1.0 to 2.0%, P: 0.025% or less (exclusive of 0%), S: 0.025% or less (exclusive of 0%), Cr: 0.05 to 1.0%, Al: 0.01 to 0.1%, N: 0.01% or less (exclusive of 0%), B: 0.0005 to 0.005%, and at least one selected from the group consisting of Ti: 0.005 to 0.07%, V: 0.05 to 0.4%, and Nb: 0.05 to 0.1%, with the balance consisting of iron and inevitable impurities, wherein the steel wire has a microstructure wherein a total area rate of ferrite and perlite is 98% or more, perlite lamellar spacing is 250 nm or less, and an area rate of the perlite is more than 40% and 80% or less, and wherein the steel wire has a tensile strength of 1300 MPa or less. The steel wire of the invention for preferably further comprises Cu: 0.20% or less (exclusive of 0%), and/or Ni: 0.20% or less (exclusive of 0%).

The invention also includes a process for manufacturing a steel wire for bolt, comprising, hot-rolling a steel having the above chemical composition, heating the steel to a temperature from a point $Ac_3$ to 1100° C. to be austenitized, cooling the steel to a temperature from 450 to 600° C. at a rate of 45 to 450° C./second, keeping the steel at the temperature from 450 to 600° C. for 8 to 11 seconds per millimeter of a diameter of the hot-rolled steel, thereby causing the steel to undergo isothermal transformation, cooling the steel to a temperature from 300 to 420° C. at a rate of 0.4 to 4.0° C./seconds, and subsequently subjecting the steel to cold wire drawing into a total area reduction rate of 50 to 80%. The point $Ac_3$ is a temperature calculated according to the following equation: $Ac_3$ (° C.)=908−224 [C]+4385 [P]+30.5 [Si]−34.4 [Mn]−23 [Ni] wherein the symbol "[(any one of these elements)]" means the content by percentage (percent by mass) of the element.

The invention also includes a process for manufacturing a bolt, using a combination of shank shaping, head shaping, and screw-cutting to form a steel wire into the bolt, wherein the steel wire for bolt obtained by the above manufacturing process is subjected to diameter reduction under a condition satisfying the following inequality (1) as the shank shaping, followed by being further subjected to the head shaping and the screw-cutting to be made into a bolt-shaped object; and further followed by being baked at a temperature from 200 to 400° C.

$$5.4\times(\text{the A-value area reduction rate})+3.15\times(\text{the A-value area reduction rate})+652\times Ceq \geq 880 \quad (1)$$

wherein A-value area reduction rate: the total area reduction rate of the steel at the time of the cold wire drawing, and B-value area reduction rate: a total area reduction rate of the steel at the time of the diameter reduction $$Ceq=[C]+[Si]/7+[Mn]/5+[Cu]/7+[Cr]/9+[Ni]/20$$

wherein the symbol "[(any one of these elements)]" means the content by percentage (% by mass) of the element.

A bolt obtained by the above-mentioned bolt manufacturing process has a tensile strength of 1200 MPa or more, a 0.2% yield strength of 1080 MPa or more, and a yield strength ratio of 0.90 or more. This bolt is also included in the present invention.

Effect of the Invention

In the steel wire of the present invention for bolt, the composition of various components therein is appropriately controlled, and further the kind of its microstructure, the presence proportion between species therein, and the form thereof are appropriately adjusted; thus, the steel wire can realize a high strength and an excellent cold forgeability, and further a bolt obtained using the steel wire of the invention for bolt is excellent in delayed fracture resistance. According to the process of the invention for manufacturing a bolt, in which the steel wire of the invention for bolt is used and further an appropriate adjustment is made about a relationship among the total area reduction rate of raw steel therefor when the steel is subjected to cold wire drawing, the total area reduction rate when the steel is subjected to diameter reduction, and the Ceq (carbon equivalent) thereof, the steel wire or the resultant bolt can realize all of an improvement in cold forgeability, a bolt strength of 1200 MPa or more, and an improvement in delayed fracture resistance.

MODE FOR CARRYING OUT THE INVENTION

As described above, conventional techniques about non-heat steel wires for bolt is focusing on either cold forgeability or delayed fracture resistance. A suggestion has not yet been made, particularly, about a technique for realizing a bolt tensile strength of 1200 to 1400 MPa and further causing the two properties to be satisfied.

Thus, the present inventors have made investigations to find out that in order to improve high-strength for bolt, cold forgeability and delayed fracture resistance, it is important to: control chemical components therefor appropriately; and further control the kind and the form of the structure of the steel wire for bolt, specifically, (1) render the structure of the steel wire for bolt a two-phase structure of ferrite and perlite, and set the area rate of perlite to a value more than 40% and 80% or less, and (2) set, to 250 nm or less, the lamellar interval for bolt subjected to cold wire drawing (before bolt formation). It has been made evident that the strength can be further improved by (3) controlling the following appropriately when the steel wire for bolt is used to be formed into the bolt shape: a relationship among the total area reduction rate of this steel wire for bolt in the cold drawing of the steel wire, the total area reduction rate when the steel wire is subjected to diameter reduction for bolt shank shaping, and the Ceq (carbon equivalent) thereof.

Hereinafter, a description will be initially made about characteristics (the items (1) and (2), and the chemical composition) of the steel wire of the present invention for bolt, and a manufacturing process therefor, and subsequently a description will be made about the process of the invention for manufacturing a bolt (the item (3)).

(1) Structure of the Steel Wire for Bolt

The steel wire of the present invention for bolt substantially has a two-phase structure of ferrite and perlite (for example, the total proportion of ferrite and perlite is 98% or more by area, preferably 99% or more by area). The area rate of perlite in the wire is more than 40%, and 80% or less. By making the steel wire to have this structure, a balance can be made good between the deformation resistance of the steel wire for bolt when this steel wire is used to be made into a bolt shape, and the strength of the resultant bolt. Ferrite is a soft phase to be important for restraining an increase in the deformation resistance while perlite is a structure in which cementite, which is hard, is arranged into the form of lamellar, and is very important for the following reason: as compared with JIS standardized steels (SCM 435, and SCM 440) that are frequently used as steels having a strength in the order of 1200 MPa, strength can be ensured even when Mo, which is expensive, is not contained and the Cr proportion therein is equivalent to or less than that in the JIS standardized steels. In a case where martensite is present in the structure, the steel is easily snapped when subjected to wire drawing. In a case where bainite is present therein, the steel is decreased in work hardening ratio so that the steel cannot attain a target strength. Thus, the area rate of martensite, bainite, and any structure other than ferrite and perlite is usually 2% or less by area, preferably 1% or less by area.

About the proportion of perlite in the present invention, if the area rate of perlite is more than 80% by area, the steel is largely lowered in cold forgeability so that a shapeable bolt form is remarkably restrained and further the forging die life is largely shortened. Thus, the upper limit of the perlite area rate is set to 80% or less by area. The upper limit of the perlite area rate is preferably 70% or less by area, more preferably 65% or less by area (in particular, 60% or less by area). However, if the perlite area rate is too small, a cold working ratio necessary for ensuring a target strength is increased so that the steel is lowered in delayed fracture resistance. Thus, the perlite area rate is set to more than 40% by area. The lower limit of the perlite area rate is preferably 42% or more by area, more preferably 43% or more by area.

(2) Perlite Lamellar Spacing

About the steel wire of the present invention for bolt, the lamellar spacing of perlite is 250 nm or less after the cold drawing. This case makes it possible to increase the quantity of strain introduced into ferrite present between the perlite lamellar in the cold drawing. As a result, the perlite phase, which is less easily deformed than the ferrite phase, can also make the maximum use of a fall in yield stress (Bauschinger effect) when compression strain is applied thereto. Thus, when the steel wire is subjected to bolt head shaping, a working load thereonto can be decreased. Additionally, if the lamellar spacing is made small, the steel is increased in ability for trapping hydrogen in the steel. Thus, this matter is also effective for improving the delayed fracture resistance. The perlite lamellar spacing is preferably 240 nm or less, more preferably 235 nm or less. The lower limit of the perlite lamellar spacing is not particularly limited, and is usually about 100 nm. Details of the adjustment of the perlite lamellar spacing will be described later; however, the perlite lamellar spacing is not easily made fine by continuous cooling through hot rolling. Therefore, the present invention is characterized by using isothermal transformation, using, for example, a lead bath, a salt bath or a fluid phase.

For the steel wire of the present invention for bolt, it is important to adjust the chemical composition appropriately, as well as control the kind and the form of the structure as described above. Hereinafter, a description will be made about the chemical composition of the steel wire of the present invention for bolt.

C: 0.30 to less than 0.50%

C is an essential element to cause the steel wire to gain a desired strength. Thus, the C proportion is specified to 0.30% or more. The C proportion is preferably 0.32% or more, more preferably 0.35% or more. However, if the C proportion is too large, the steel wire is increased in deformation resistance and is lowered in toughness ductility to be increased in crack initiation rate when made into a bolt shape, or the forging die life is shortened. Thus, the C proportion is specified to less than 0.50%. The C proportion is preferably 0.48% or less, more preferably 0.43% or less.

Si: 0.02 to 0.1%

Si acts as a deoxidizing material when the steel is made into ingots, and is an element necessary as a solid solution element for strengthening the matrix. In order to cause Si to exhibit such effects effectively, the Si proportion is preferably 0.02% or more, more preferably 0.03% or more. However, if the Si proportion is too large, the steel is raised in deformation resistance to be lowered in cold forgeability. Thus, the Si proportion is specified to 0.1% or less. The Si proportion is preferably 0.09% or less, more preferably 0.08% or less.

Mn: 1.0 to 2.0%

Mn is effective as a deoxidizing and desulfurizing element in the steel in a molten state, and also has an effect of restraining the steel material from being lowered in ductility when the material is subjected to hot working. The element is further an element that is dissolved in a solid state into ferrite to increase the steel in strength. Thus, the Mn proportion is specified to 1.0% or more. The Mn proportion is preferably 1.20% or more, more preferably 1.30% or more. However, if the Mn proportion is too large, the steel is increased in central segregation to be snapped when subjected to wire drawing, or be lowered in delayed fracture resistance. Thus, the Mn proportion is specified to 2.0% or less. The Mn proportion is preferably 1.80% or less, more preferably 1.60% or less (in particular, 1.50% or less).

P: 0.025% or less (exclusive of 0%)

P is an element present as an impurity, and segregates in grain boundaries of ferrite to lower the steel in deformability. P causes ferrite to undergo solid solution strengthening, so as to be also an element for increasing the steel in deformation resistance. The element causes a fall in the grain boundary strength to lower the delayed fracture resistance, too. Thus, the P proportion is preferably made as low as possible. The P proportion is adjusted to 0.025% or less. The P proportion is preferably 0.015% or less, more preferably 0.010% or less. As the P proportion is made smaller, a more preferred result is obtained. However, if the proportion is extremely decreased, costs for manufacturing the steel material are largely increased. Thus, P is contained usually in a proportion of about 0.002%.

S: 0.025% or less (exclusive of 0%)

In the same manner as P, S is an element present as an impurity. When S is bonded to Mn so as to be present in the form of MnS, a large effect is not produced. However, if S is bonded to Fe to be precipitated in the form of FeS in the grain boundaries, the steel is largely lowered in deformability. Thus, in the same manner as P, the P proportion is preferably made as small as possible. The S proportion is specified to 0.025% or less. The S proportion is preferably 0.015% or less, more preferably 0.010% or less. As the S proportion is made smaller, a more preferred result is obtained. However, if the proportion is extremely decreased, costs for manufacturing the steel material are largely increased. Thus, S is contained usually in a proportion of about 0.002%.

Cr: 0.05-1.0%

Cr is an element having effects of making the lamellar spacing of the perlite phase fine, and further improving the steel in strength through solid solution strengthening. Cr is also effective for improving the steel in corrosion resistance to be improved in delayed fracture resistance. In order to cause Cr to exhibit such effects effectively, the Cr proportion is specified to 0.05% or more. The Cr proportion is preferably 0.10% or more, more preferably 0.12% or more. If the Cr proportion is too large, coarse particles of carbide are produced so that the steel is lowered in cold forgeability and corrosion resistance. Thus, the Cr proportion is specified to 1.0% or less. The Cr proportion is preferably 0.7% or less, more preferably 0.5% or less.

Al: 0.01-0.1%

Al is useful as a deoxidizing agent, and further causes N present in the steel and dissolved in a solid solution form to be fixed as AlN. Thus, Al is useful for making the steel lower in deformation resistance and better in deformability. Thus, the Al proportion is specified to 0.01% or more. The Al proportion is preferably 0.015% or more, more preferably 0.020%. If the Al proportion is too large, Al dissolved in a solid solution form increases in quantity to cause the ferrite phase to be hardened, so that the forging die life is shortened when the steel is formed into a bolt shape. Additionally, nonmetallic inclusions such as $Al_2O_3$ increase in quantity so that the steel is lowered in deformability. Thus, the Al proportion is set to 0.1% or less. The Al proportion is preferably 0.080% or less, more preferably 0.070% or less.

N: 0.01% or less (exclusive of 0%)

When N is present as N dissolved in a solid solution form in the steel, N makes the steel large in deformation resistance by dynamic strain ageing, and low in deformability. Thus, the N proportion is specified to 0.01% or less. The N proportion is preferably 0.0070% or less, more preferably 0.0050% or less. As the N proportion is made smaller, a more preferred result is obtained. However, if the proportion is extremely decreased, costs for manufacturing the steel material are largely increased. Thus, N is contained usually in a proportion of about 0.001%.

B: 0.0005-0.005%

In the same manner as Al, B is an element that is bonded to N dissolved in a solid solution form in the steel so that BN is formed to decrease the dynamic strain ageing, thereby improving the steel in cold forgeability. In the manufacturing process, which will be detailed later, in the step of heating raw steel at point $Ac_3$ or higher and subsequently cooling this steel, B precipitates in the form of a carbide ($Fe_{23}(C, B)_6$) to lighten a strength fall of the grain boundaries that is based on an increase in the concentration of P in the grain boundaries. Thus, B is useful for improving the delayed fracture resistance. Thus, the B proportion is specified to 0.0005% or more. The B proportion is preferably 0.0010% or more, more preferably 0.0015% or more. However, any nitride or carbide of B slightly produces an effect of restraining the generation of coarse crystal grains and an effect as sites for trapping hydrogen in the steel. Thus, in the present invention, it is essential to use a multiple addition of B with one or more elements (at least one of Ti, Nb and V, which will be detailed later) capable of forming sites for trapping hydrogen in the steel. The addition of an excessive proportion of B causes Fe2B to segregate in the crystal grain boundaries to lower the boundary strength, thereby making the steel low in hot ductility and delayed fracture resistance. Thus, the B proportion is set to 0.005% or less. The B proportion is preferably 0.0040% or less, more preferably 0.0035% or less.

At least one selected from the group consisting of Ti: 0.005-0.07%, V: 0.05-0.4%, and Nb: 0.05-0.1%

Ti, Nb and V are each an element that is bonded to N or C dissolved in a solid solution form in the steel so that a compound is formed to decrease the dynamic strain ageing based on the dissolved N or C, thereby improving the steel in cold forgeability. Respective carbides and carbonitrides of these elements restrain the generation of coarse crystal grains to contribute to an improvement of the steel in toughness, and further act as sites for trapping hydrogen in the steel to be useful for improving the delayed fracture resistance. Thus, the Ti proportion is specified to 0.005% or more; the V proportion, to 0.05% or more; and the Nb proportion, to 0.05% or more. The Ti proportion is preferably 0.010% or more, more preferably 0.020% or more. The V proportion is preferably 0.06% or more, more preferably 0.07% or more. However, if the grains of the carbonitrides are too coarse, the grains are lowered in capability of acting as the hydrogen trapping sites and further become stress-concentrated sites when the steel is subjected to cold forging for bolt, so that the generation of cracks therein is promoted. For controlling the generation of coarse grains of the carbides and carbonitrides in the present invention, essential is the multiple-addition of these elements with B, which is combined with N or C dissolved in a solid solution form to produce a compound. If the content by percentage of each of these elements is too large, the delayed fracture resistance and the cold forgeability are lowered as described above. Thus, the Ti proportion is specified to 0.07% or less; the V proportion, to 0.4% or less; and the Nb proportion, to 0.1% or less. The Ti proportion is preferably 0.070% or less, more preferably 0.065% or more. The V proportion is preferably 0.30% or less, more preferably 0.25% or less. The Nb proportion is preferably 0.08% or less, more preferably 0.07% or less.

The basic components of the steel wire of the present invention for bolt are as described above. The balance thereof is substantially made of iron. However, it is naturally allowable that the steel contains inevitable impurities brought in accordance with the situation of raw materials thereof, the manufacturing facilities, and others. Furthermore, the steel wire of the present invention for bolt may optionally contain Cu and/or Ni.

Cu: 0.20% or less (exclusive 0%) and/or Ni: 0.20% or less (exclusive 0%)

Cu is an element for improving the steel in corrosion resistance, and restraining the penetration of hydrogen into the steel, which produces a bad effect onto the delayed fracture. For improving the delayed fracture resistance, it is desired to add Cu in a large proportion. In order to cause the steel to exhibit such an advantageous effect effectively, the Cu proportion is set preferably to 0.03% or more, more preferably to 0.04% or more. However, if Cu is added in an excessive proportion, the steel is lowered in cold forgeability, particularly, in crack initiation critical upsetting ratio.

Thus, the Cu proportion is preferably 0.20% or less. The Cu proportion is preferably 0.18% or less, more preferably 0.15% or less.

In the same manner as Cu, Ni is an element having an effect of improving the steel in corrosion resistance. Ni also has an effect of cancelling a fall in the hot ductility that is caused by making the Cu proportion large. Thus, it is recommendable to add Ni in a proportion equal to that of Cu. The Ni proportion is set preferably to 0.03% or more, more preferably to 0.04% or more. However, in the same manner as Cu, if Ni is added in an excessive proportion, the steel is lowered in cold forgeability. Thus, the Ni proportion is preferably 0.20% or less. The Ni proportion is preferably 0.18% or less, more preferably 0.15% or less.

In the present invention, Cu and Ni are each inevitably contained in a proportion up to about 0.02%.

In order to manufacture the steel wire of the present invention for bolt, it is important to produce steel ingots in accordance with an ordinary process, hot-roll the ingots, heat the resultant rolled steel to a temperature from point $Ac_3$ to 1100° C., cause the steel to undergo isothermal transformation at a temperature from 450 to 600° C., cool the steel, and then subject the steel to cold wire drawing into a total area reduction rate of 50 to 80%. The heating makes it possible to cancel the structure of the rolled steel; the isothermal transformation, to produce a two-phase structure made of ferrite and perlite and having a fine lamellar spacing; and the cold wire drawing, to make the lamellar spacing finer, and further give tensile strain to the ferrite phase between the lamellar. This matter will be described in detail hereinafter.

Heating at a Temperature from the Point $Ac_3$ to 1100° C.

The rolled steel is heated to the point $Ac_3$ or higher to austenitize the structure thereof, whereby the structure of the rolled steel uneven in strength can be cancelled. However, if the heating temperature is too high, the crystal grains become coarse so that the structure will also tend to become coarse after the isothermal transformation. Thus, the upper limit of the heating temperature is set to 1100° C. or lower. The lower limit of the heating temperature is preferably "the $Ac_3$ point+50° C." or higher, more preferably "the $Ac_3$ point+100° C." or higher. The upper limit of the heating temperature is preferably 1050° C. or lower, more preferably 1000° C. or lower. When the heating temperature is within the temperature range, the heating period is usually from about 3 to 10 minutes.

The point $Ac_3$ can be calculated in accordance with the following:

$$Ac_3 \ (° C.)=908-224 \ [C]+4385 \ [P]+30.5 \ [Si]-34.4 \ [Mn]-23 \ [Ni]$$

(source: Shigeo Ohkubo, "P. P. Thermal Treatment", p. 1, Ohmsha, Ltd. (1964)).
Isothermal Transformation at a Temperature from 450 to 600° C.

After the heating at a temperature from the point $Ac_3$ to 1100° C., the steel is kept at a temperature from 450 to 600° C. to make it possible to realize a ferrite and perlite structure smaller in lamellar spacing than any steel according to hot rolling, which brings continuous cooling. The isothermal transformation at the temperature also makes it possible to adjust the area rate of perlite to more than 40% and 80% or less. However, if the isothermal transformation temperature is lower than 450° C., bainite or martensite is produced to lower the steel in cold forgeability. If the isothermal transformation temperature is higher than 600° C., the lamellar spacing of the perlite phase becomes large to lower the strength and the hydrogen trapping power. The lower limit of the isothermal transformation temperature is preferably 480° C. or higher, more preferably 500° C. or higher. The upper limit of the isothermal transformation temperature is preferably 580° C. or lower, more preferably 560° C. or lower. About the isothermal transformation period, it is advisable to adjust, into the range of about 8 to 11, the value of [the isothermal transformation period (second)]/the diameter D (mm) of the rolled steel].

It is advisable to attain the isothermal transformation, for example, by immersing the heated rolled steel in, for example, a lead bath, a salt bath or a fluid phase. In this case, the cooling rate from the above-mentioned heating temperature to the isothermal transformation temperature is usually from about 45 to 450° C./second. It is also advisable to cool the steel after the isothermal transformation to a temperature from about 300 to 420° C. at a cooling rate of about 0.4 to 4.0° C./second.

Cold Wire Drawing into a Total Area Reduction Rate of 50 to 80%

After the isothermal transformation, the cold wire drawing into a total area reduction rate of 50 to 80% makes it possible to cause the steel to ensure strength (the steel wire has, for example, a tensile strength of 1000 MPa or more, preferably 1050 Pa or more, more preferably 1100 MPa or more after subjected to the wire drawing) by work hardening, and further adjust the lamellar spacing of perlite generated by the isothermal transformation to a smaller value, specifically, 250 nm or less. Moreover, the cold wire drawing makes it possible to give tensile strain to the ferrite phase between the lamellar, exhibit Bauschinger effect up to the maximum degree, and further decrease the deformation resistance of the steel when the steel is compressed (the working load when the steel is formed into a bolt head shape). If the total area reduction rate is more than 80%, the hardness of the bolt below its neck is raised to lower the steel in delayed fracture resistance. Moreover, following the wire drawing, a lubricating coat layer generated onto the steel wire surface is decreased in quantity so that the cold forgeability is lowered. When the total area reduction rate is set to 80% or less, the tensile strength of the steel wire comes to have a tensile strength of 1300 MPa or less. If the total area reduction rate is less than 50%, the steel cannot ensure tensile strength. The lower limit of the total area reduction rate is preferably 53% or more, more preferably 55% or more. The upper limit of the total area reduction rate is preferably 75% or less, more preferably 70% or less.

The diameter of the steel wire of the present invention for bolt is, for example, from about 8 to 12 mm.

The process of the present invention for manufacturing a bolt is characterized by controlling the steel wire for bolt, which is obtained as described above, appropriately as described in the above-mentioned item (3) about a relationship among the total area reduction rate of the steel wire for bolt in the cold wire drawing thereof, the total area reduction rate thereof in the diameter reduction for forming the steel into a bolt shank shape, and the Ceq (carbon equivalent) thereof.

(3) Relationship Among the Total Area Reduction Rate in the Cold Wire Drawing, the Total Area Reduction Rate in the Diameter Reduction, and the Ceq The steel wire of the present invention for bolt is excellent in tensile strength. In order that the steel wire can produce this effect to a maximum level to make the bolt strength higher, it is important to make an appropriate adjustment about the relationship among the total area reduction rate of the steel wire for bolt in the cold wire drawing at the time of manufacturing the steel wire (hereinafter referred to as the A-value are reduction), the total area reduction rate thereof in the diameter reduction at the time of the formation of the bolt shank shape (referred to as the B-value area reduction rate), and the Ceq (carbon equivalent). The steel wire of the present invention for bolt can be improved in strength by work hardening in the cold wire drawing; however, if the steel is made too high in strength by the cold wire drawing, at the time of manufacturing the steel wire into a bolt the hardness of the bolt below its neck is raised to increase the bolt in delayed fracture sensitivity. Thus, the upper limit of the total area reduction rate in the cold wire drawing is specified to 80% or less. In the diameter reduction, the steel may not undergo work hardening or may be reversely lowered in strength when the area rate is low. Accordingly, in the process of the invention for manufacturing a bolt, an appropriate control is made about the following three: the strength of the steel wire for bolt; the strength rise of the steel that is based on the diameter reduction into the bolt shank; and the Ceq (carbon equivalent), which is high in correlation with the strength. The control makes it possible to attain a bolt strength of 1200 MPa or more (preferably 1300 MPa or more), and further restrain a rise in the hardness of the bolt below its neck and a fall in the delayed fracture resistance.

The wire drawing and the diameter reduction are different from each other in working manner or working rate. Thus, therebetween, the bolt strength is affected to different degrees even when the same area reduction rate is attained. Thus, considering the respective effects produced onto the bolt strength by the total area reduction rate in the wire drawing, the total area reduction rate in the diameter reduction, and the carbon equivalent, specifically, the A-value area reduction rate, the B-value area reduction rate, and the Ceq (carbon equivalent) are adjusted to satisfy the following inequality (1):

$$5.4\times(\text{the A-value area reduction rate})+3.15\times(\text{the B-value area reduction rate})+652\times Ceq \geq 880 \quad (1)$$

In the inequality (1), respective coefficients of the A-value area reduction rate and the B-value area reduction rate have been obtained as described below.

Coefficient of the A-Value Area Reduction Rate:

A steel having each chemical composition in Examples that will be described later has been used to be manufactured into steel wires while the total area reduction rate in the wire drawing thereof (the A-value area reduction rate) has been varied within a range of 10% or more. The respective strengths of the resultant steel wires have been measured, and between the steel wire strength when the A-value area reduction rate has been set to 10% and the steel wire strengths at the respective area reduction rates, a difference ($\Delta TS$) was gained. A relationship between the area reduction rates and $\Delta TS$ has been linearly approximated. As a result, a coefficient of 5.4 has been gained.

Coefficient of the B-Value Area Reduction Rate:

A steel having each of the chemical compositions in Examples, which will be described later, has been used to be produced, at a constant cold wire drawing ratio, into steel wires. The steel wires have then been subjected to diameter reduction while the area reduction rate (the B-value area reduction rate) has been varied within a range of 15% or more. The increase of the strength (of each of the steel wires) after the diameter reduction from the strength before the work has been gained. A relationship between the B-value area reduction rates and the strength increase quantities has been linearly approximated. As a result, a coefficient of 3.15 has been gained.

Coefficient of the Ceq:

The following Ceq is a typical Ceq used for carbon steel for mechanical structures; and a coefficient of each element has been specified as described below since the coefficient has a good correlation with tensile strengths of steel wires after the wires have been subjected to isothermal transformation, the tensile strengths being to be described in Examples:

$$Ceq=[C]+[Si]/7+[Mn]/5+[Cu]/7+[Cr]/9+[Ni]/20$$

wherein the symbol "[(any one of these elements)]" means the content by percentage (% by mass) of the element.

The upper limit of the inequality is not particularly limited, and is usually about 1020 or less. The B-value area reduction rate and the Ceq are not particularly limited as far as the inequality (1) is satisfied. Usually, the B-value area reduction rate is from about 35 to 50, and the Ceq is from about 0.6 to 0.8.

After the steel wire is subjected to the diameter reduction to satisfy the relationship of the inequality (1), the steel wire is pressed by an ordinary process to be formed into a bolt head. Thereafter, this steel is subjected to screw-cutting in a cold gear rolling step. It is advisable to form a bolt-shaped object through this process. The cold forgeability referred to in connection with the present invention is evaluated on the basis of the life of a forging die used in the formation of any bolt head by pressing, as will also be described in Examples.

In the present invention, it is important that after the bolt-shaped object is formed by the shank shaping, the head shaping and the screw-cutting, the bolt-shaped object is baked at a temperature from 200 to 400° C. The baking at the temperature makes it possible to improve the resultant bolt in yield strength by age hardening based on residual solute elements, as well as by the precipitation of fine carbide particles. By this baking treatment, the bolt can satisfy a strength in the JIS class 12.9 (tensile strength: 1200 MPa or more, yield strength: 1080 MPa or more, and yield strength ratio: 0.9 or more). If the baking temperature is higher than 400° C., the strain introduced by the cold working is released so that the bolt is lowered in strength. Thus, the bolt cannot attain a target strength. The baking temperature is preferably from 250 or more and 350° C. or less.

The bolt obtained by the manufacturing process of the present invention has a tensile strength of 1200 MPa or more, a 0.2% yield strength of 1080 MPa or more, and a yield strength ratio of 0.90 or more. This bolt is also included in the present invention. The tensile strength is preferably 1300 MPa or more, the 0.2% yield strength is preferably 1150 MPa or more, and the yield strength ratio is preferably 0.92 or more. The respective upper limits of the tensile strength, the 0.2% yield strength and the yield strength ratio are not particularly limited. The tensile strength, the 0.2% yield strength and the yield strength ratio are, for example, 1400 MPa or less, 1300 MPa or less, and 0.95 or less, respectively.

The present invention makes it possible to realize a bolt having a high strength of 1200 MPa or more and simultaneously achieving both cold forgeability and delayed fracture resistance. Consequently, fastening parts can be made largely small and light. The invention can make engine parts of automobiles, and other parts light to contribute largely to reduce fuel consumption, and decrease $CO_2$.

EXAMPLES

Hereinafter, the present invention will be more specifically by way of working examples. The invention is not limited by these examples. The examples may be varied, and the varied examples may be naturally carried out as far as the varied examples are matchable with the subject matter that has been described above and will be described hereinafter. The varied examples are each included in the technical scope of the invention.

A steel having each chemical composition shown in Tables 1 and 2 was produced into an ingot by an ordinary process, and then the ingot was hot-rolled to yield a rolled steel having a rolled steel diameter (of φ15.5 to 28.0 mm) shown in Table 3 or 4. Thereafter, the rolled steel was passed through a continuous furnace and heated under a condition shown in Table 3 or 4 to be austenitized (heating period: about 7 minutes). The steel was immersed in a lead bath to be subjected to isothermal transformation treatment. The period for the isothermal transformation treatment was adjusted to satisfy the following: [immersion period "t" (second)/[rolled steel diameter "D" (mm)]=8-11

After the isothermal transformation, the steel was cooled to a temperature from 370 to 420° C. at a cooling rate of 0.6 to 2.0° C./second. Subsequently, the steel was passed through a sand tank to remove melted lead adhering onto the surface layer of the rolled steel. Thereafter, the steel was air-cooled, and cooled with hot water (about 80° C.) to remove the heat. The steel was then wound into a coil form. Next, the rolled steel was washed with an acid to remove an oxidized scale layer generated onto the surface layer, and further subjected to zinc phosphate coating treatment. The resultant was subjected to wire drawing into a total area reduction rate (the A-value area reduction rate) shown in Table 3 or 4 to manufacture a steel wire having a drawn wire diameter of 10.0 to 14.1 mm.

The steel wire was used and cold-forged, using a partformer, so as to manufacture M10 bolts. The M10 bolt manufacturing process had a shank reducing work based on forward extrusion, and a press forming step for their bolt head. The cold forgeability of the steel wire or bolts was evaluated on the basis of the forging die life in a bolt forming step giving the highest pressing load (third punch). After the bolt head forming, the bolts were each subjected to screwcutting in a cold forming by rolling, and then baked under a condition shown in Table 3 or 4.

About each of the wire steels obtained as described above, the structure thereof was evaluated by processes described below, and further the tensile strength thereof was measured on the basis of JIS Z2241. The respective tensile strengths of five test pieces from this steel wire were measured, and the average thereof was used as the tensile strength of the wire steel.

(a) Structure Identification

The steel wire was embedded into a resin so that a cross section of the steel wire (cross section perpendicular to the rolling direction of the steel wire) could be observed, and the surface of the resultant member was polished. The member was subjected to Nital etching to cause the structure thereof to make its appearance. The structure of each of its moieties was identified in accordance with the situation of white, gray and black areas observable with an optical microscope (magnifying power: 400 magnifications). Any moiety having a white area without having gray or black area was judged as a ferrite phase; any moiety having a black region including dispersed gray areas, as a perlite phase; and any moiety having a region in which white areas were intermingled with each other into form of needles, as bainite phase. The structure of the moiety judged as a bainite phase was separately photographed at respective magnifications of 2000 and 8000 by a scanning electron microscope (SEM). In this way, it was checked whether or not the judgment was a misjudgment.

(b) Perlite Proportion Measurement

From each of a D/4 region and a D/8 region (D: steel wire diameter) of a cross section of each of the steel wires, 4 spots were arbitrarily selected, and observed at 400 magnifications with an optical microscope (observing visual field: 225 μm×175 μm). The structure thereof was photographed to give 8 photographs totally. Each of the structure photographs was binarized into white spots and black spots through an image processing software. From the proportion of the black spots corresponding to a perlite phase, the perlite proportion was calculated out. The average of the values of the 8 photographs was used as the perlite proportion of each of the sample steel wires.

(c) Perlite Lamellar Spacing Measurement

A D/4 region (D: steel wire diameter) of a cross section of the steel wire was observed at 8000 magnifications by the scanning electron microscope (SEM) (observing visual field: 8.75 μm×11.25 μm) to measure the number of lamellar present within a given length of the perlite grains. Thus, the lamellar spacing was gained. The measurement was made at two spots in each of the observed visual fields. The number of the observed visual fields was three. The respective lamellar spacing at the spots, the total number of which was six, were arranged in turn from the minimum value thereof to obtain cumulative frequencies. A graph obtained by readjusting a relationship between the cumulative frequencies (transverse axis) and the lamellar spacing (vertical axis) was linearly approximated to gain an intercept (minimum lamellar spacing). The value of ["the intercept value"×1.65] was used as the average lamellar spacing.

The cold forgeability was evaluated on the basis of the forging die life and cracking of the steel wire in the press forming in the bolt forming step in which the press forming load was the highest (third punch). The cracking in the press forming was judged through an operation of pulling out one bolt whenever the formation of about 10 to 20 bolts was finished. Simultaneously, the forging die life about each of the sample steel wires was determined by examining an injure transcribed to the head of some of the resultant bolts and generated with a fracture of the mold.

Furthermore, about the bolts as described above, mechanical properties thereof (the tensile strength, the yield strength and the yield strength ratio of this bolt) were measured (according to JIS Z2241), and a delayed fracture resistance test was made. In the delayed fracture resistance test, some of the bolts were immersed in 15% HCl for 30 minutes, washed with water and dried. A loop type strain delayed fracture tester was used to apply a stress (90% of the tensile strength) to each of the bolts in the atmosphere. After 100 hours, the delayed fracture resistance of the bolt was evaluated by examining whether or not the bolts fractured. About each of the tensile strength and the yield stress of the bolt, 5 test bolts out of the bolts were measured. The respective averages from the measured values were used as the tensile strength and the yield stress of the bolt.

These results are shown in Tables 3 and 4. Any wording "Ferrite+perlite" in their column "Structure" means that in the above-mentioned item "(a) Structure Identification", no structure other than ferrite and perlite was unable to be recognized.

TABLE 1

| Steel No. | Chemical composition (% by mass) * The balance consists of iron and inevitable impurities. | | | | | | | | | | | | | | | |
|---|---|---|---|---|---|---|---|---|---|---|---|---|---|---|---|---|
| | C | Si | Mn | P | S | Cu | Ni | Cr | Al | N | B | Ti | V | Nb | Ceq |
| D-1 | 0.32 | 0.06 | 1.43 | 0.008 | 0.007 | 0.01 | 0.02 | 0.14 | 0.034 | 0.0036 | 0.0022 | 0.034 | — | — | 0.63 |
| D-2 | 0.46 | 0.05 | 1.45 | 0.006 | 0.008 | 0.01 | 0.01 | 0.12 | 0.033 | 0.0032 | 0.0020 | 0.032 | — | — | 0.77 |
| D-3 | 0.35 | 0.07 | 1.42 | 0.007 | 0.007 | 0.02 | 0.02 | 0.14 | 0.042 | 0.0035 | 0.0021 | 0.038 | — | — | 0.66 |
| D-4 | 0.36 | 0.04 | 1.60 | 0.007 | 0.007 | 0.02 | 0.02 | 0.14 | 0.041 | 0.0036 | 0.0017 | 0.035 | — | — | 0.71 |
| D-5 | 0.35 | 0.05 | 1.45 | 0.007 | 0.007 | 0.01 | 0.01 | 0.70 | 0.037 | 0.0036 | 0.0019 | 0.035 | — | — | 0.73 |
| D-6 | 0.34 | 0.06 | 1.43 | 0.006 | 0.007 | 0.02 | 0.02 | 0.12 | 0.040 | 0.0036 | 0.0021 | 0.056 | — | — | 0.65 |
| D-7 | 0.34 | 0.03 | 1.34 | 0.002 | 0.005 | 0.08 | 0.09 | 0.16 | 0.037 | 0.0035 | 0.0019 | 0.040 | — | — | 0.65 |
| D-8 | 0.36 | 0.05 | 1.41 | 0.008 | 0.007 | 0.01 | 0.01 | 0.14 | 0.043 | 0.0035 | 0.0016 | — | 0.07 | — | 0.67 |
| D-9 | 0.36 | 0.06 | 1.44 | 0.007 | 0.006 | 0.01 | 0.01 | 0.13 | 0.040 | 0.0036 | 0.0018 | — | 0.20 | — | 0.67 |
| D-10 | 0.35 | 0.05 | 1.46 | 0.007 | 0.006 | 0.01 | 0.01 | 0.14 | 0.038 | 0.0034 | 0.0019 | — | — | 0.05 | 0.67 |

TABLE 2

| Steel No. | Chemical composition (% by mass) * The balance consists of iron and inevitable impurities. | | | | | | | | | | | | | | | |
|---|---|---|---|---|---|---|---|---|---|---|---|---|---|---|---|---|
| | C | Si | Mn | P | S | Cu | Ni | Cr | Al | N | B | Ti | V | Nb | Ceq |
| C-1 | 0.25 | 0.05 | 1.41 | 0.007 | 0.007 | 0.01 | 0.01 | 0.16 | 0.035 | 0.0034 | 0.0018 | 0.035 | — | — | 0.56 |
| C-2 | 0.33 | 0.04 | 1.40 | 0.007 | 0.007 | 0.01 | 0.01 | 0.15 | 0.040 | 0.0033 | 0.0019 | — | — | — | 0.63 |
| C-3 | 0.85 | 0.24 | 0.75 | 0.007 | 0.007 | 0.01 | 0.01 | 0.12 | 0.038 | 0.0034 | 0.0019 | 0.032 | — | — | 1.05 |
| C-4 | 0.57 | 0.04 | 1.34 | 0.007 | 0.007 | 0.01 | 0.01 | 0.12 | 0.038 | 0.0034 | 0.0019 | 0.031 | — | — | 0.86 |
| C-5 | 0.34 | 0.29 | 1.43 | 0.007 | 0.007 | 0.02 | 0.02 | 0.14 | 0.044 | 0.0036 | 0.0020 | 0.035 | — | — | 0.69 |
| C-6 | 0.34 | 0.04 | 0.70 | 0.006 | 0.008 | 0.01 | 0.01 | 0.13 | 0.036 | 0.0033 | 0.0018 | 0.033 | — | — | 0.50 |
| C-7 | 0.35 | 0.03 | 2.20 | 0.007 | 0.006 | 0.02 | 0.02 | 0.12 | 0.038 | 0.0034 | 0.0018 | 0.035 | — | — | 0.81 |
| C-8 | 0.34 | 0.03 | 1.33 | 0.004 | 0.005 | 0.24 | 0.22 | 0.15 | 0.035 | 0.0035 | 0.0021 | 0.039 | — | — | 0.67 |
| C-9 | 0.34 | 0.04 | 1.43 | 0.008 | 0.006 | 0.01 | 0.01 | 0.02 | 0.038 | 0.0037 | 0.0018 | 0.038 | — | — | 0.64 |
| C-10 | 0.35 | 0.05 | 1.41 | 0.007 | 0.007 | 0.01 | 0.01 | 1.50 | 0.038 | 0.0036 | 0.0021 | 0.039 | — | — | 0.81 |
| C-11 | 0.33 | 0.04 | 1.32 | 0.008 | 0.007 | 0.01 | 0.01 | 0.11 | 0.034 | 0.0057 | — | 0.036 | — | — | 0.61 |
| C-12 | 0.35 | 0.04 | 1.43 | 0.006 | 0.008 | 0.01 | 0.01 | 0.12 | 0.037 | 0.0032 | 0.0072 | 0.035 | — | — | 0.66 |
| C-13 | 0.36 | 0.04 | 1.45 | 0.007 | 0.008 | 0.01 | 0.01 | 0.12 | 0.042 | 0.0033 | 0.0024 | 0.150 | — | — | 0.67 |
| C-14 | 0.34 | 0.04 | 1.42 | 0.007 | 0.008 | 0.01 | 0.01 | 0.13 | 0.044 | 0.0034 | 0.0017 | — | 0.50 | — | 0.65 |
| C-15 | 0.35 | 0.04 | 1.45 | 0.008 | 0.007 | 0.01 | 0.01 | 0.14 | 0.038 | 0.0034 | 0.0022 | — | — | 0.50 | 0.66 |
| C-16 | 0.36 | 0.05 | 1.43 | 0.007 | 0.007 | 0.01 | 0.01 | 0.14 | 0.002 | 0.0049 | 0.0022 | 0.037 | — | — | 0.67 |
| C-17 | 0.35 | 0.06 | 1.44 | 0.006 | 0.007 | 0.01 | 0.01 | 0.13 | 0.180 | 0.0034 | 0.0019 | 0.034 | — | — | 0.66 |
| C-18 | 0.35 | 0.06 | 1.42 | 0.006 | 0.007 | 0.01 | 0.01 | 0.13 | 0.034 | 0.0150 | 0.0021 | 0.033 | — | — | 0.66 |

TABLE 3

| Experiment No. | Sample | Rolled steel diameter (nm) | Heating temperature (° C.) | Isothermic transformation temperature (° C.) | Tensile strength (MPa) after isothermic transformation | Wire drawing | | Tensile strength (MPa) | Wire drawn material microstructure | | |
|---|---|---|---|---|---|---|---|---|---|---|---|
| | | | | | | Drawn wire diamter (nm) | A-value area reduction (%) | | Microstructure | Lamellar spacing (nm) | Perlite area proportion (%) |
| 1 | D-1 | 20.0 | 970 | 540 | 715 | 12.10 | 63.4 | 1092 | Ferrite + perlite | 238 | 42.0 |
| 2 | | 20.0 | 970 | 540 | 715 | 14.10 | 50.3 | 1015 | Ferrite + perlite | 245 | 42.5 |
| 3 | | 17.0 | 970 | 540 | 715 | 10.00 | 65.4 | 1084 | Ferrite + perlite | 228 | 41.5 |
| 4 | D-2 | 20.0 | 970 | 540 | 825 | 12.10 | 63.4 | 1200 | Ferrite + perlite | 214 | 73.6 |
| 5 | | 22.0 | 970 | 540 | 823 | 12.10 | 69.8 | 1235 | Ferrite + perlite | 184 | 76.2 |
| 6 | | 15.5 | 970 | 650 | 830 | 12.10 | 39.1 | 1050 | Ferrite + perlite | 272 | 72.2 |
| 7 | | 20.0 | 970 | 420 | 827 | 12.10 | 63.4 | 1165 | Ferrite + perlite | 278 | 73.7 |
| 8 | | 20.0 | 970 | 540 | 850 | 12.10 | 63.4 | 1116 | Bainite, generated | — | — |
| 9 | D-3 | 20.0 | 970 | 540 | 745 | 12.10 | 63.4 | 1120 | Ferrite + perlite | 238 | 47.1 |
| 10 | | 20.0 | 970 | 540 | 745 | 12.10 | 63.4 | 1120 | Ferrite + perlite | 238 | 47.1 |

TABLE 3-continued

| | | | | | | | | | | | |
|---|---|---|---|---|---|---|---|---|---|---|---|
| 11 | | 20.0 | 970 | 540 | 745 | 12.10 | 63.4 | 1120 | Ferrite + perlite | 238 | 47.1 |
| 12 | | 20.0 | 970 | 540 | 745 | 12.10 | 63.4 | 1120 | Ferrite + perlite | 238 | 47.1 |
| 13 | | 20.0 | 1250 | 540 | 704 | 12.10 | 63.4 | 1080 | Ferrite + perlite | 268 | 49.3 |
| 14 | D-4 | 20.0 | 970 | 540 | 782 | 12.10 | 63.4 | 1143 | Ferrite + perlite | 242 | 44.1 |
| 15 | D-5 | 20.0 | 970 | 540 | 835 | 12.10 | 63.4 | 1205 | Ferrite + perlite | 241 | 42.0 |
| 16 | D-6 | 20.0 | 970 | 540 | 739 | 12.10 | 63.4 | 1108 | Ferrite + perlite | 236 | 41.9 |
| 17 | D-7 | 20.0 | 970 | 540 | 760 | 12.10 | 63.4 | 1112 | Ferrite + perlite | 245 | 42.4 |
| 18 | D-8 | 20.0 | 970 | 540 | 755 | 12.10 | 63.4 | 1123 | Ferrite + perlite | 232 | 44.8 |
| 19 | D-9 | 20.0 | 970 | 540 | 753 | 12.10 | 63.4 | 1125 | Ferrite + perlite | 231 | 43.6 |
| 20 | D-10 | 20.0 | 970 | 540 | 758 | 12.10 | 63.4 | 1119 | Ferrite + perlite | 228 | 43.1 |

| | | Diameter-reducing work | | Bolt workability | | | | Bolt properties | | | Delayed | |
|---|---|---|---|---|---|---|---|---|---|---|---|---|
| Experiment No. | Sample | Bolt shank diameter (nm) | B-value area reduction (%) | Mold lifespan (the number of bolts) | Crack in forging | Inequality (1) | Baking conditions | Tensile strength (MPa) | Yield strength (MPa) | Yield strength ratio | fracture resistance | Notes |
| 1 | D-1 | 9.15 | 42.8 | 97,900 | None | 890 | 250° C. × 2 hr | 1218 | 1150 | 0.94 | ○ | |
| 2 | | 9.15 | 57.9 | 86,700 | None | 865 | 250° C. × 2 hr | 1184 | 1065 | 0.90 | — | Seizure, generated in diameter-reduced shank region |
| 3 | | 9.15 | 16.3 | 103,500 | None | 815 | 250° C. × 2 hr | 1145 | 1015 | 0.89 | — | Bolt strength, not achieved |
| 4 | D-2 | 9.15 | 42.8 | 90,500 | None | 981 | 250° C. × 2 hr | 1320 | 1217 | 0.92 | ○ | |
| 5 | | 9.15 | 42.8 | 89,600 | None | 1015 | 250° C. × 2 hr | 1354 | 1240 | 0.92 | ○ | |
| 6 | | 9.15 | 42.8 | 97,500 | None | 849 | 250° C. × 2 hr | 1189 | 1034 | 0.87 | — | Bolt strength, not achieved |
| 7 | | 9.15 | 42.8 | 88,000 | None | 981 | 250° C. × 2 hr | 1254 | 1110 | 0.89 | (○) | Bolt yield stress ratio, unattached |
| 8 | | 9.15 | 42.8 | 92,000 | None | 981 | 250° C. × 2 hr | 1240 | 1085 | 0.88 | — | Bolt yield stress ratio, not achieved |
| 9 | D-3 | 9.15 | 42.8 | 89,900 | None | 910 | 250° C. × 2 hr | 1250 | 1175 | 0.94 | ○ | |
| 10 | | 9.15 | 42.8 | 89,900 | None | 910 | — | 1215 | 1060 | 0.87 | — | Bolt yield stress ratio, not achieved |
| 11 | | 9.15 | 42.8 | 89,900 | None | 910 | 250° C. × 2 hr | 1225 | 1135 | 0.93 | ○ | |
| 12 | | 9.15 | 42.8 | 89,900 | None | 910 | 450° C. × 2 hr | 1103 | 975 | 0.88 | — | Bolt strength, not achieved |
| 13 | | 9.15 | 42.8 | 94,500 | None | 910 | 250° C. × 2 hr | 1185 | 1073 | 0.91 | — | Bolt strength, not achieved |
| 14 | D-4 | 9.15 | 42.8 | 85,700 | None | 937 | 250° C. × 2 hr | 1278 | 1180 | 0.92 | ○ | |
| 15 | D-5 | 9.15 | 42.8 | 87,600 | None | 951 | 250° C. × 2 hr | 1318 | 1206 | 0.92 | ○ | |
| 16 | D-6 | 9.15 | 42.8 | 89,400 | None | 902 | 250° C. × 2 hr | 1262 | 1162 | 0.92 | ○ | |
| 17 | D-7 | 9.15 | 42.8 | 86,500 | None | 898 | 250° C. × 2 hr | 1253 | 1136 | 0.91 | ○ | |
| 18 | D-8 | 9.15 | 42.8 | 89,300 | None | 912 | 250° C. × 2 hr | 1246 | 1130 | 0.91 | ○ | |
| 19 | D-9 | 9.15 | 42.8 | 89,100 | None | 916 | 250° C. × 2 hr | 1257 | 1154 | 0.92 | ○ | |
| 20 | D-10 | 9.15 | 42.8 | 89,700 | None | 912 | 250° C. × 2 hr | 1253 | 1146 | 0.91 | ○ | |

TABLE 4

| Experiment No. | Sample | Rolled steel diameter (nm) | Heating temperature (° C.) | Isothermic Transformation Temperature (° C.) | Tensile strength (MPa) after isothermic transformation | Wire drawing Drawn wire diameter (nm) | A-value area reduction (%) | Tensile strength (MPa) | Wire drawn material microstructure Microstructure | Lamellar spacing (nm) | Perlite area proportion (%) |
|---|---|---|---|---|---|---|---|---|---|---|---|
| 21 | C-1 | 20.0 | 970 | 540 | 673 | 12.10 | 63.4 | 1035 | Ferrite + perlite | 266 | 32.8 |
| 22 |     | 28.0 | 970 | 540 | 670 | 12.10 | 81.3 | 1138 | Ferrite + perlite | 268 | 32.8 |
| 23 | C-2 | 20.0 | 970 | 540 | 705 | 12.10 | 41.4 | 1070 | Ferrite + perlite | 278 | 38.0 |
| 24 | C-3 | 20.0 | 970 | 540 | 1038 | 12.10 | 63.4 | 1407 | Perlite | 248 | 100.0 |
| 25 | C-4 | 20.0 | 970 | 540 | 905 | 12.10 | 63.4 | 1272 | Ferrite + perlite | 202 | 94.8 |
| 26 | C-5 | 20.0 | 970 | 540 | 752 | 12.10 | 63.4 | 1117 | Ferrite + perlite | 253 | 43.6 |
| 27 | C-6 | 20.0 | 970 | 540 | 642 | 12.10 | 63.4 | 1011 | Ferrite + perlite | 278 | 46.4 |
| 28 | C-7 | 20.0 | 970 | 540 | 844 | 12.10 | 63.4 | 1212 | Ferrite + perlite | 175 | 42.3 |
| 29 | C-8 | 20.0 | 970 | 540 | 775 | 12.10 | 63.4 | 1144 | Ferrite + perlite | 233 | 48.1 |
| 30 | C-9 | 20.0 | 970 | 540 | 710 | 12.10 | 63.4 | 1075 | Ferrite + perlite | 262 | 47.3 |
| 31 | C-10 | 20.0 | 970 | 540 | 946 | 12.10 | 63.4 | 1322 | Ferrite + perlite | 143 | 44.3 |
| 32 | C-11 | 20.0 | 970 | 540 | 715 | 12.10 | 63.4 | 1075 | Ferrite + perlite | 286 | 51.4 |
| 33 | C-12 | 20.0 | 970 | 540 | 744 | 12.10 | 63.4 | 1114 | Ferrite + perlite | 238 | 46.4 |
| 34 | C-13 | 20.0 | 970 | 540 | 765 | 12.10 | 63.4 | 1125 | Ferrite + perlite | 236 | 44.4 |
| 35 | C-14 | 20.0 | 970 | 540 | 740 | 12.10 | 63.4 | 1109 | Ferrite + perlite | 232 | 47.6 |
| 36 | C-15 | 20.0 | 970 | 540 | 751 | 12.10 | 63.4 | 1116 | Ferrite + perlite | 228 | 48.2 |
| 37 | C-16 | 20.0 | 970 | 540 | 755 | 12.10 | 63.4 | 1132 | Ferrite + perlite | 231 | 52.7 |
| 38 | C-17 | 20.0 | 970 | 540 | 767 | 12.10 | 63.4 | 1135 | Ferrite + perlite | 230 | 53.4 |
| 39 | C-18 | 20.0 | 970 | 540 | 765 | 12.10 | 63.4 | 1133 | Ferrite + perlite | 232 | 51.3 |

| Experiment No. | Sample | Diameter-reducing work Bolt shank diameter (nm) | B-value area reduction (%) | Bolt workability Mold lifespan (the number of bolts) | Crack in forging | Inequality (1) | Baking conditions | Bolt properties Tensile strength (MPa) | Yield strength (MPa) | Yield strength ratio | Delayed fracture resistance | Notes |
|---|---|---|---|---|---|---|---|---|---|---|---|---|
| 21 | C-1 | 9.15 | 42.8 | 105,900 | None | 842 | 250° C. × 2 hr | 1100 | 1005 | 0.91 | — | Bolt strength, not achieved |
| 22 |     | 9.15 | 42.8 | 88,700 | Generated | 938 | 250° C. × 2 hr | 1267 | 1187 | 0.94 | — | Flange, cracked |
| 23 | C-2 | 9.15 | 42.8 | 86,500 | None | 772 | 250° C. × 2 hr | 1139 | 1040 | 0.91 | — | Bolt strength, not achieved |
| 24 | C-3 | 9.15 | 42.8 | 64300 | Generated | 1162 | 250° C. × 2 hr | 1530 | 1380 | 0.90 | — | Flange, cracked |
| 25 | C-4 | 9.15 | 42.8 | 82600 | None | 1037 | 250° C. × 2 hr | 1389 | 1265 | 0.91 | (o) | Mold lifespan, shortened |
| 26 | C-5 | 9.15 | 42.8 | 82700 | None | 925 | 250° C. × 2 hr | 1258 | 1145 | 0.91 | (o) | Mold lifespan, shortened |
| 27 | C-6 | 9.15 | 42.8 | 111,800 | None | 805 | 250° C. × 2 hr | 1113 | 1025 | 0.92 | — | Bolt strength, not achieved |
| 28 | C-7 | 9.15 | 42.8 | 82500 | None | 1006 | 250° C. × 2 hr | 1351 | 1245 | 0.92 | * | Mold lifespan, shortened |
| 29 | C-8 | 9.15 | 42.8 | 93,000 | Generated | 916 | 250° C. × 2 hr | 1265 | 1154 | 0.91 | — | Flange, cracked |
| 30 | C-9 | 9.15 | 42.8 | 99,100 | None | 892 | 250° C. × 2 hr | 1190 | 1078 | 0.91 | — | Bolt strength, not achieved |
| 31 | C-10 | 9.15 | 42.8 | 98300 | None | 1004 | 250° C. × 2 hr | 1359 | 1240 | 0.91 | * | Mold lifespan, shortened |

TABLE 4-continued

| 32 | C-11 | 9.15 | 42.8 | 83500 | Generated | 877 | 250° C. × 2 hr | 1239 | 1136 | 0.92 | — | Flange, cracked |
| 33 | C-12 | 9.15 | 42.8 | 92,300 | Generated | 906 | 250° C. × 2 hr | 1245 | 1138 | 0.91 | — | Flange, cracked |
| 34 | C-13 | 9.15 | 42.8 | 81400 | Generated | 915 | 250° C. × 2 hr | 1254 | 1145 | 0.91 | — | Flange, cracked |
| 35 | C-14 | 9.15 | 42.8 | 83300 | Generated | 898 | 250° C. × 2 hr | 1239 | 1124 | 0.91 | — | Flange, cracked |
| 36 | C-15 | 9.15 | 42.8 | 82800 | Generated | 910 | 250° C. × 2 hr | 1251 | 1134 | 0.91 | — | Flange, cracked |
| 37 | C-16 | 9.15 | 42.8 | 78900 | Generated | 914 | 250° C. × 2 hr | 1255 | 1141 | 0.91 | — | Flange, cracked |
| 38 | C-17 | 9.15 | 42.8 | 80600 | Generated | 909 | 250° C. × 2 hr | 1270 | 1156 | 0.91 | — | Flange, cracked |
| 39 | C-18 | 9.15 | 42.8 | 81000 | Generated | 907 | 250° C. × 2 hr | 1248 | 1185 | 0.95 | — | Flange, cracked |

Experiments Nos. 1, 4, 5, 9, 11 and 14 to 20 are examples in each of which chemical components of a steel satisfied the requirement of the present invention and further a steel wire for bolt and a process for manufacturing bolts satisfied the requirements of the invention, and were each excellent in cold forgeability when the bolts were manufactured, and further excellent in delayed fracture resistance while these experiment examples had a tensile strength more than 1100 MPa, which is generally said to show a remarkable hydrogen embrittlement. Furthermore, the bolts of the invention each brought a result of satisfying mechanical properties sufficient for high-strength bolts, that is, requirements that the tensile strength is 1200 MPa or more, the 0.2% yield stress is 1080 MPa or more, and the yield strength ratio (the 0.2% yield strength/tensile strength) is 0.90 or more. The mechanical properties satisfy a class-12.9 strength section, which is classified into the highest strength section according to JIS B 1051.

By contrast, Experiments Nos. 2, 3, 6 to 8, 10, 12 and 13 are examples in each of which chemical components of a steel satisfied the requirement of the invention but either a steel wire for bolt or a process for manufacturing bolts did not satisfy the requirement of the invention.

In Experiments Nos. 2 and 3, the strength of the resultant bolts was low since the respective processes for manufacturing the bolts did not satisfy the relationship according to the inequality (1).

In Experiment No. 6, the bolt strength was low since the total area reduction rate in the wire drawing (the A-value area reduction rate) was small and further the process for manufacturing the bolts did not satisfy the relationship according to the inequality (1).

In Experiment No. 7, the isothermal transformation treatment temperature was high so that the perlite lamellar spacing was large and the yield strength ratio of the bolts was lowered. Since the yield strength ratio was low, plastic deformation advanced in the delayed fracture test so that the samples were made lower in substantial load stress than the other samples, so as to be good in delayed fracture resistance.

In Experiment No. 8, the isothermal transformation treatment temperature was low so that bainite was produced. Thus, the yield strength ratio of the bolts was small.

In Experiment No. 10, no baking was conducted after the formation into the bolt shape, the samples were small in yield strength and yield strength ratio. In Experiment No. 12, the baking temperature was high after the formation into the bolt shape; thus, the strength was lowered.

In Experiment No. 13, the heating temperature after the hot rolling was high so that the perlite lamellar spacing was large. Thus, the bolt strength was lowered.

Experiments Nos. 21 to 39 are examples in each of which chemical components of a steel did not satisfy the requirement of the invention.

Experiments Nos. 21 and 22 are examples in each of which the C proportion was small. In Experiment No. 21, the bolt strength was lowered while in Experiment No. 22, the total area reduction rate in the wire drawing (the A-value area reduction rate) was more than 80% so that the cold forgeability was lowered.

In Experiment No. 23, Ti, Nb and V were not added at all, and did not satisfy the inequality (1). Thus, the bolt strength was lowered.

In Experiment No. 24, the C proportion and the Si proportion were large and the Mn proportion was small. Thus, the steel was made of only a perlite phase to be lowered in cold forgeability. In Experiment No. 25, the C proportion was large so that the perlite proportion was large. Thus, the steel was lowered in cold forgeability.

In Experiment No. 26, the Si proportion was large so that the steel was large in perlite lamellar spacing to be lowered in cold forgeability.

Experiment No. 27 was an example in which the Mn proportion was small so that the steel wire for bolt was large in perlite lamellar spacing, and further the relationship according to the inequality (1) was not satisfied in the manufacture of the bolts so that the bolt strength was lowered. In Experiment No. 28, the Mn proportion was large so that the steel was lowered in cold forgeability.

In Experiment No. 29, the Cu and Ni proportions were large so that the steel was lowered in cold forgeability.

In Experiment No. 30, the Cr proportion was small so that the steel wire for bolt was large in perlite lamellar spacing to be lowered in bolt strength. In Experiment No. 31, the Cr proportion was large so that the steel was lowered in cold forgeability.

In Experiment No. 32, B was not added so that the dynamic strain ageing decreasing effect based on solute N was insufficient, and further the quenchability improving effect based on solute B was not produced. Thus, the steel wire for bolt was large in perlite lamellar spacing to be lowered in cold forgeability. Since solute N was high, the age hardening in the wire drawing or the cold forging was promoted so that the strength was high.

Experiment No. 33 is an example in which B was excessively added. B is bonded to N to be usually dispersed and precipitated in the form of BN in the steel. Atoms of B that are not bonded to N are partially dissolved in a solid solution form into the steel. However, atoms of B that correspond to a quantity over the solid solution limit are bonded to Fe to be segregated in the form of Fe2B in the grain boundaries. For this reason, the excessive B-addition make the boundary strength lower to increase the generation of cracks in the cold forging. In the present evaluation, the moiety where the work strain quantity was largest (the flange of the bolts) was cracked.

Experiments Nos. 34 to 36 are examples in each of which Ti, V or Nb was excessively added. These elements are elements useful for decreasing solid solution form-dissolved C or N, which causes dynamic strain ageing; however, when the elements are each added in a large proportion, coarse Ti carbonitride, V carbonitride and Nb carbonitride grains are produced, respectively. However, these function as stress concentration sources in the cold forging. Thus, particularly, the flange of the bolts, in which the work strain quantity was large, was cracked.

In Experiment No. 37, the Al proportion was small so that solid solution form-dissolved N remained in the steel. Thus, the crack initiation limit was lowered by dynamic strain ageing following heat generated by working in the cold forging. Thus, the flange of the bolts was cracked.

Experiment No. 38 is an example in which Al was excessively added. Al is bonded to solid solution form-dissolved N to be precipitated in the form of AlN so that Al has an effect of restraining a bad effect of dynamic strain ageing in the cold forging. However, in the case of the excessive addition, Al bonded to oxygen in the steel is dispersed in the form of hard $Al_2O_3$ to function as stress concentration sources in the cold forging, and further Al dissolved in the solid solution form into the steel cause the ferrite phase to be hardened, so as to lower the steel also in deformability. Thus, the crack initiation limit is lowered. In the present evaluation, therefore, the flange of the bolts was cracked.

Experiment No. 39 is an example in which the N proportion was large. In the same manner as in the case where Al was too small in quantity, dynamic strain ageing based on solid solution form-dissolved N became remarkable to lower the crack initiation limit in the cold forging. In the present evaluation also, the flange of the bolts, in which the work strain quantity was the largest, was cracked.

The invention claimed is:

1. A steel wire comprising, by mass:
C: more than 0.35 to 0.50%;
Si: 0.02 to 0.1%;
Mn: 1.0 to 2.0%;
P: 0.025% or less, exclusive of 0%;
S: 0.025% or less, exclusive of 0%;
Cr: 0.05 to 1.0%;
Al: 0.01 to 0.1%
N: 0.01% or less, exclusive of 0%;
B: 0.0005 to 0.005%;
at least one selected from the group consisting of Ti: 0.005 to 0.07%, V: 0.05 to 0.4%, and Nb: 0.05 to 0.1%; and iron,
wherein the steel wire has a microstructure wherein a total area rate of ferrite and perlite is 98% or more, perlite lamellar spacing is 240 nm or less, and an area rate of the perlite is more than 40% and 80% or less;
wherein the steel wire has a tensile strength of 1300 MPa or less, and
wherein the steel wire further comprises Cu: 0.03 to 0.20% and/or Ni: 0.03 to 0.20%.

2. A process for manufacturing the steel wire according to claim 1, the process comprising:

(i) hot-rolling a steel comprising, by mass:
C: more than 0.35 to 0,50%;
Si: 0.02 to 0.1%;
Mn: 1.0 to 2.0%;
P: 0,025% or less, exclusive of 0%;
S: 0.025% or less, exclusive of 0%;
Cr: 0.05 to 1.0%;
Al: 0.01 to 0.1%;
N: 0.01% or less, exclusive of 0%;
B: 0.0005 to 0.005%;
at least one selected from the group consisting of Ti: 0.005 to 0.07%, V: 0.05 to 0.4%, and Nb: 0.05 to 0.1%; and iron;
wherein the steel further comprises Cu: 0.03 to 0.20% and/or Ni: 0.03 to 0.20%;
ii) heating the steel to a temperature o a point $Ac_3$ to 1100° C. to be austenitized;
iii) cooling the steel to a temperature from 450 to 600° C. at a rate of 45 to 450° C./second;
(iv) keeping the steel at the temperature from 450 to 600° C. for 8 to 11 seconds per millimeter of a diameter of the hot-rolled steel, thereby causing the steel to undergo isothermal transformation;
(v) cooling the steel to a temperature from 300 to 420° C. at a rate of 0.4 to 4.0° C./seconds; and
(vi) subsequently subjecting the steel to cold wire drawing into a total area re uction rate of 50 to 80%,
wherein the point $Ac_3$ is a temperature calculated according to the following equation:

$$Ac_3(° C.)=908-224[C]+4385[P]+30.5[Si]-34.4[Mn]-23[Ni]$$ wherein brackets indicate mass percent of the bracketed element.

3. A process for manufacturing a bolt, the process comprising shank shaping, head shaping, and screw-cutting to form a steel wire into the bolt,
wherein the steel wire is obtained by the process of claim 2, and the steel wire is subjected to diameter reduction under a condition satisfying the following inequality (1) as the shank shaping, followed by being further subjected to the head shaping and the screw-cutting to be made into a bolt-shaped object; and further followed by being baked at a temperature from 200 to 400° C., $$5.4\times(\text{the }A\text{-value area reduction rate})+3.15\times(\text{the }A\text{-value area reduction rate})+652\times Ceq \geq 880 \qquad (1)$$

A-value area reduction rate: the total area reduction rate of the steel at the time of the cold wire drawing, and
B-value area reduction rate: a. total area reduction rate of the steel at the time of the diameter reduction, $$Ceq=[C]+[Si]/7+[Mn]/5+[Cu]/7+[Cr]/9+[Ni]/20,$$

wherein brackets indicate mass percent of the bracketed element.

4. The steel wire of claim 1, comprising the Ti.
5. The steel wire of claim 1, comprising the V.
6. The steel wire of claim 1, comprising the Nb.
7. The steel wire of claim 1, comprising the Ti and the V.
8. The steel wire of claim 1, comprising the Ti and the Nb.
9. The steel wire of claim 1, comprising the V and the Nb.
10. The steel wire of claim 1, comprising the Ti, the V and the Nb.
11. The steel wire of claim 1, comprising the Cu.
12. The steel wire of claim 1, comprising the Ni.
13. The steel wire of claim 1, comprising the Cu and the Ni.
14. The steel wire of claim 11, comprising 0.04% or more of the Cu.

15. The steel wire of claim 12, comprising 0.04% or more of the Ni.

16. The steel wire of claim 13, comprising 0.04% or more of the Cu and 0.04% or more of the Ni.

17. The steel wire of claim 1, wherein the perlite lamellar spacing is 214 nm or less.

18. The steel wire of claim 1, wherein the area rate of the perlite is 42% - 80%.

19. The steel wire of claim 1, wherein the area rate of the perlite is 43% - 80%.

20. The steel wire of claim 17, wherein the area rate of the perlite is 43% - 80%.

* * * * *